(12) United States Patent
Wang

(10) Patent No.: US 6,214,071 B1
(45) Date of Patent: Apr. 10, 2001

(54) OIL SEPARATOR STRUCTURE FOR AN OIL COLLECTOR BLOWER

(76) Inventor: Ming-Chih Wang, P.O. Box 82-144, Taipei (TW)

(*) Notice: Subject to any disclaimer, the term of this patent is extended or adjusted under 35 U.S.C. 154(b) by 0 days.

(21) Appl. No.: 09/333,015

(22) Filed: Jun. 15, 1999

(51) Int. Cl.[7] .................................................. B01D 45/16
(52) U.S. Cl. .............................. 55/337; 55/399; 55/450; 55/459.1; 55/385.1
(58) Field of Search .................................. 55/337, 385.3, 55/385.5, 399, 385.1, 429, 447–450, 456–458, 459.1, 473, 461, 467, DIG. 18, DIG. 30

(56) References Cited

U.S. PATENT DOCUMENTS

| | | | |
|---|---|---|---|
| 2,511,967 | * | 6/1950 | Campbell . |
| 2,582,423 | * | 1/1952 | Foley . |
| 3,853,513 | * | 12/1974 | Carson . |
| 4,234,328 | * | 11/1980 | Hudson, Jr. . |
| 4,668,256 | * | 5/1987 | Billiet et al. . |
| 5,113,671 | * | 5/1992 | Westermeyer . |
| 5,404,730 | * | 4/1995 | Westermeyer . |
| 5,460,147 | * | 10/1995 | Bohl . |

FOREIGN PATENT DOCUMENTS 10-311627 * 11/1998 (JP) .

* cited by examiner

Primary Examiner—David A. Simmons
Assistant Examiner—Fred Prince
(74) Attorney, Agent, or Firm—A & J

(57) ABSTRACT

A fluid level measuring device for measuring a fluid filling level in a container contains a float disposed in the container and a magnet disposed in the container. The magnet is coupled to the float in terms of movement and, in the event of a change in the fluid filling level, executes a movement that corresponds to a change in fluid level. A magnetic field sensor is disposed in a zone of influence of magnetic field generated by the magnet and outputs an electrical signal which is representative of a height of the fluid level.

1 Claim, 5 Drawing Sheets

OIL SEPARATOR STRUCTURE FOR AN OIL COLLECTOR BLOWER

BACKGROUND OF THE INVENTION (a) Field of the Invention

The present invention relates to an oil collector blower, more particularly to an oil separator for an oil collector blower that can positively separate oil and air generated during processing of machine tools, such as CNC lathes, milling machines, grinding machines, and the like.

(b) Description of the Prior Art

The structure of a conventional blower is shown in FIG. 1. It mainly includes a housing 11, a motor having a rotary shaft passing through the housing 11 to lockably secure vanes 12, a cover 14 lockably provided at a front opening of the housing 11, a seal ring 15, a metal mesh 16, and a connecting tube element 17. When the motor 13 is actuated and the vanes 12 are rotated, oil vapors and exhaust are quickly induced via an inlet hole 171 of the connecting tube element 17. The fast current of oil-containing air is guided by outlet 111 to be blown out via a discharge hole 112. As the oil is not separated from the air, the oil vapors and the exhaust will pollute the environment, in particular the operators of the machines. Improvements are therefore necessary.

SUMMARY OF THE INVENTION

A primary object of the present invention is to provide an oil separator for an oil collector blower, which can positively separate the oil and air in oil vapors and exhaust generated during processing of machine tools to achieve multiple filtration to thereby allow recycling of oil and discharge of cleaner air, thus preventing environmental pollution The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
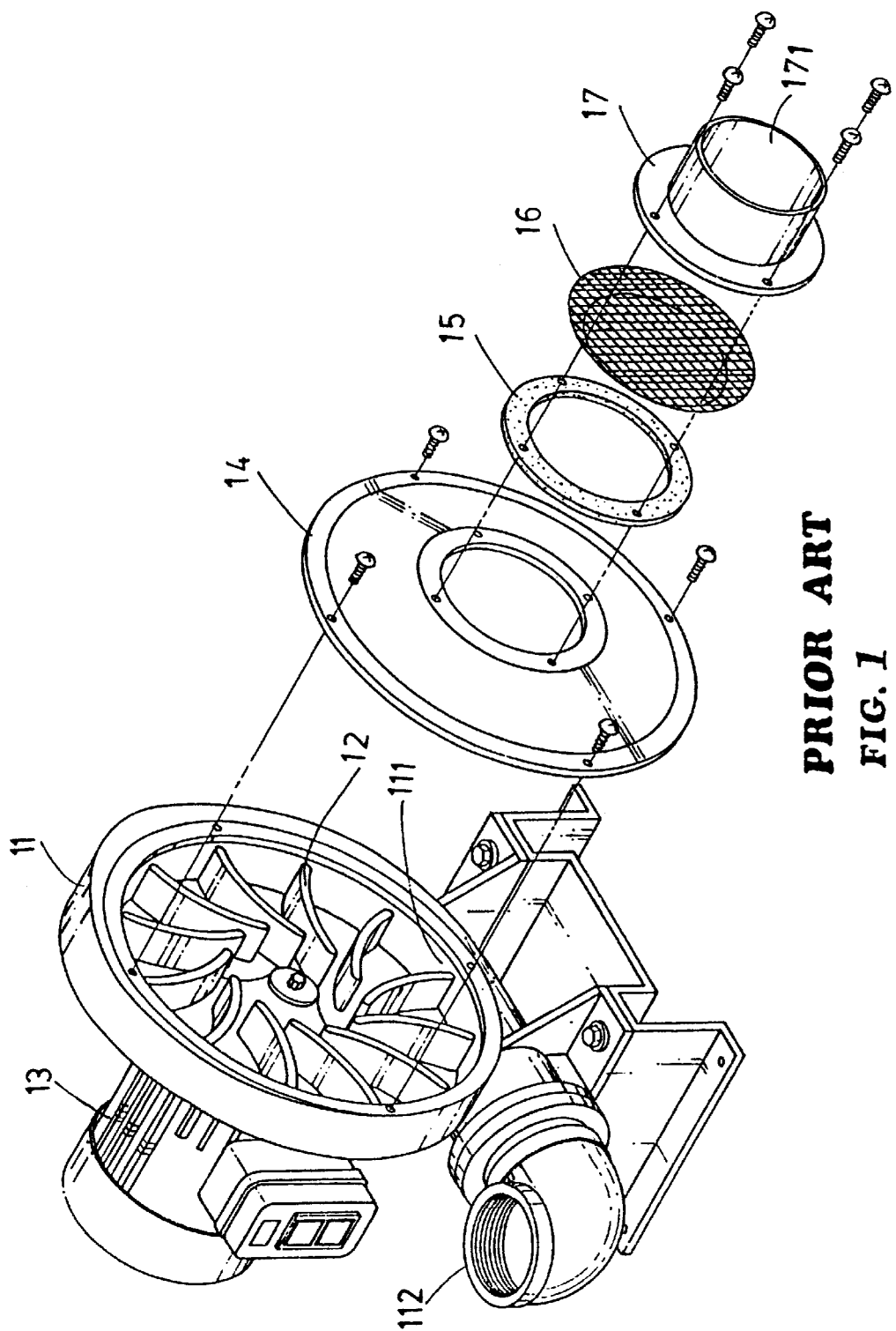
FIG. 1 is an exploded perspective view of the prior art.
Figure 2:
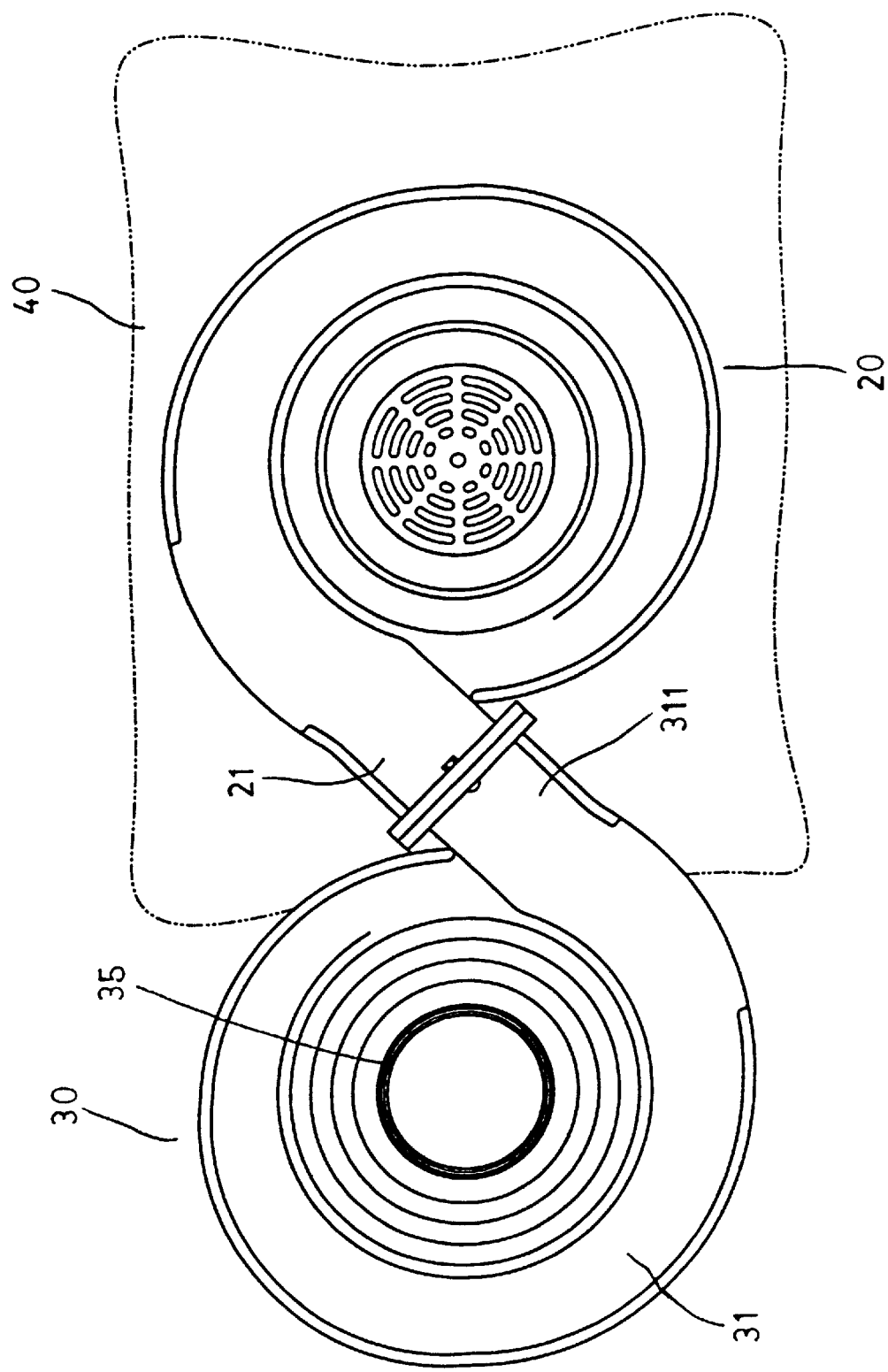
FIG. 2 is an assembled plan view of the present invention.
Figure 3:
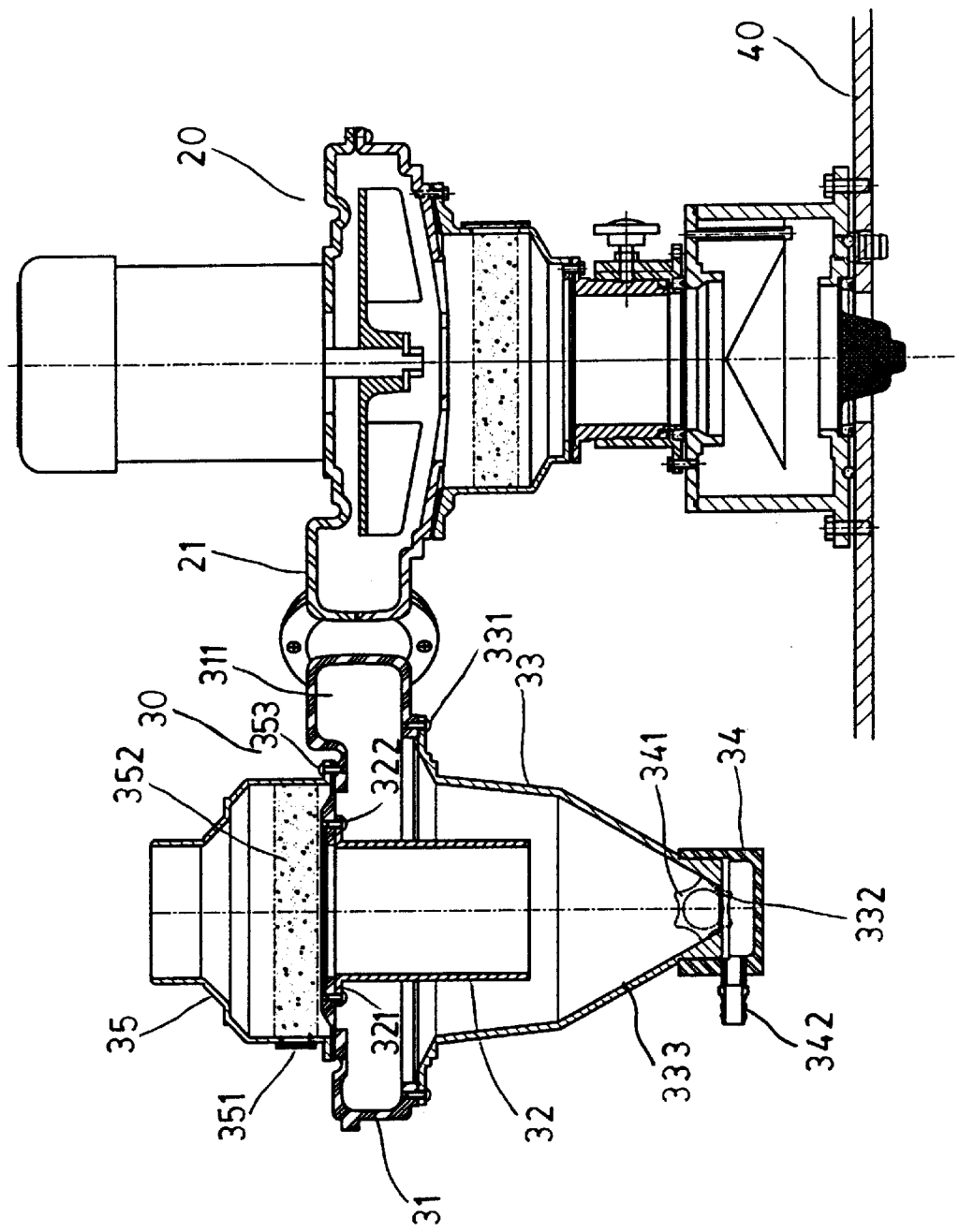
FIG. 3 is an assembled sectional view of the present invention.
Figure 4:
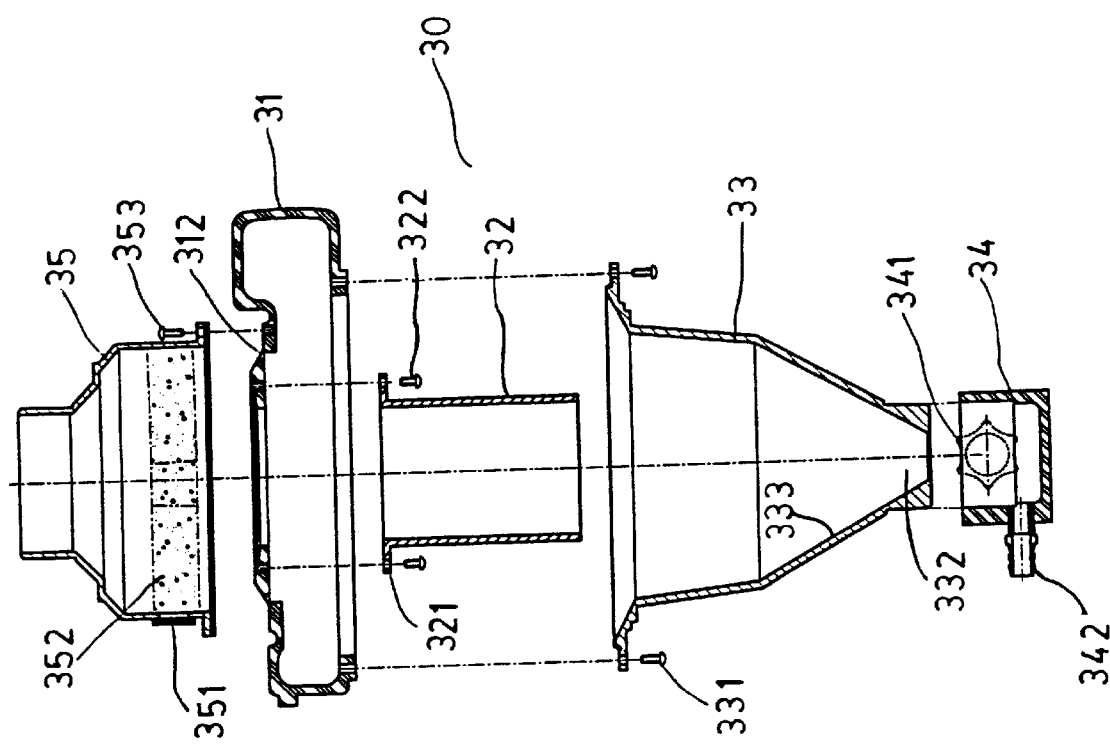
FIG. 4 is an exploded sectional view of an oil separator of the present invention.

With reference to FIGS. 2, 3 and 4, in an oil separator structure for an oil collector blower according to the present invention, an oil collector blower 20 vertically erected on a tool machine body is connected to an oil separator 30 in the position of its outlet duct 21. The oil separator 30 includes a worm body 31, a barrel 32, a collection tank 33, a bottom cover 34, and a discharge tube 35.

The worm body 31 has an exhaust inlet 311 connected to the outlet duct 21 of the oil collector blower 20; a through hole 312 in a top end, and an abdominal chamber connected to the barrel 32 using screws 322.

The barrel 32 has a wide lip 321 at a top portion that is locked in the abdominal chamber of the worm body 31 using screws 322 such that the barrel 32 is oriented downwardly and dips into the collector tank 33.

The collector tank 33 has a bottom section configured to resemble a funnel that is fixedly connected to a lower end of the worm body 31 by screws 331.

The bottom cover 34 is assembled to an oil chute 332 at the bottom portion of the collector tank 33 by means of locking knob 341. A guide tube 342 is disposed on one side of the bottom cover 34.

The discharge tube 35 has a curved cover 351 on one side of its wall for placement of a filter material 352. The curved cover 351 is locked to the upper end of the worm body 31 by a screw 353.

Figure 5:
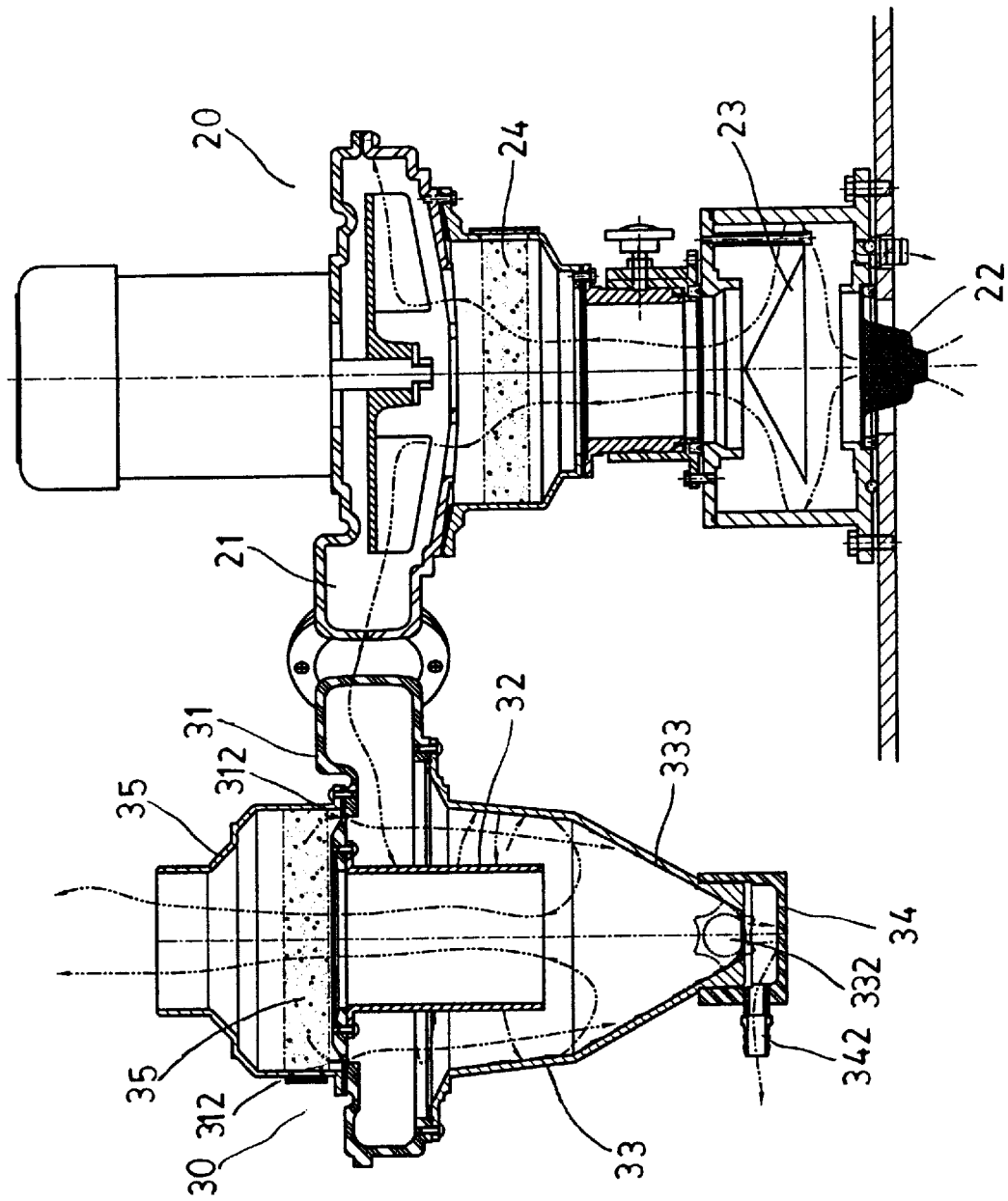
FIG. 5 is a schematic view illustrating operation of the present invention.

In use, with reference to FIG. 5, when the oil collector blower 20 is actuated, oil vapors and exhaust are induced via a filter mesh 22 at the bottom portion of the oil collector blower 20 through an induction hood 23 and a filter material 24. This is a preliminary filtering. The once-filtered oil vapors and exhaust are then guided via the outlet duct 21 into the worm body 31 of the oil separator 30 to form a downward swirling pressure. In this way, a large amount of air is compressed by the funnel-shaped collector tank 33 and rises to the barrel 32 and is then discharged through the discharge tube 35. The oil vapors, due to the centrifugal force generated by the swirl, condense on a conical face 333 of the collector tank 33. The drops of oil formed on the conical face then flow downwardly via the oil chute 332 to the guide tube 342 of the bottom cover 34 for recovery. As for the oil collected by the filter material 352, it flows through the through hole 312 of the worm body 31 into the collector tank 33. It can therefore be seen that the present invention provides a multiple filtering effect.

In summary, the oil separator structure for an oil collector blower of the present invention can indeed separate the oil generated during processing of a machine tool 40, such as CNC lathes, milling machines, grinding machines, etc., from the air and eliminate the drawbacks of the prior art.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An oil separator structure for an oil collector blower, comprising a vertical oil collector blower having an outlet duct connected to an oil separator, said oil separator including a worm body, a barrel, a collector tank, a bottom cover, and a discharge tube, wherein said worm body has a top side provided with a through hole and an abdominal chamber connected to said barrel such that said barrel dips downwardly into said collector tank after assembly, said collector tank having a bottom section forming a funnel shape and being secured to a lower end of said worm body and enclosing said barrel, said collector tank further having an oil chute at a bottom portion thereof, said bottom cover being assembled to said oil chute, a guide tube being disposed on one side of said bottom cover, said discharge tube being locked to an upper end of said worm body and being adapted for receiving a filter material;

whereby when said oil collector blower is actuated to filter oil vapors and exhaust, the oil vapors and exhaust are guided via said outlet duct into said worm body of said oil separator to form a downward swirling pressure, causing the air to be compressed by said collector tank and rise to said barrel to be blown upwardly out through said discharge tube, the oil vapors condensing on a conical face of said collector tank due to centrifugal force generated by the pressure swirl, drops of oil flowing downwardly into said guide tube of said bottom cover for recovery, oil collected by said filter material flowing down said through hole of said worm body into said collector tank, thereby achieving a multiple filtering effect.

* * * * *